Figure 1:
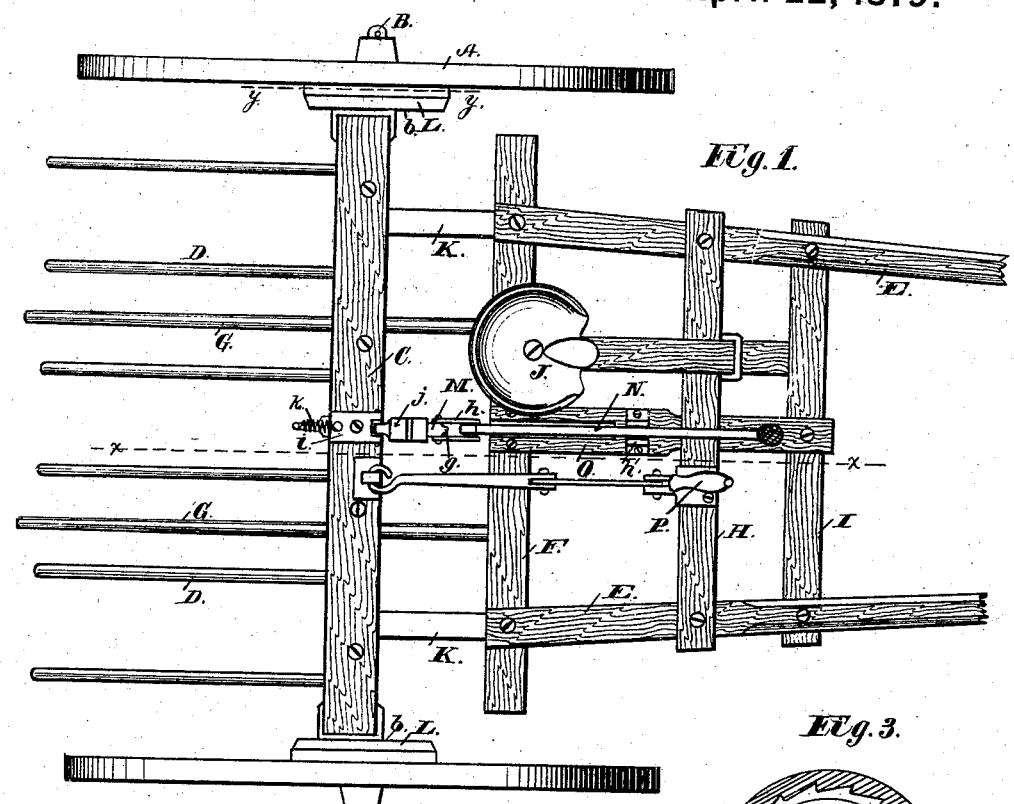

C. SCHOLZ.
Horse Hay-Rake.

No. 214,713. Patented April 22, 1879.

Inventor:
Charles Scholz
by Peck & Ritchie
his Attys.

Witnesses:
Chas. M. Peck
P. H. Gunckel

UNITED STATES PATENT OFFICE.

CHARLES SCHOLZ, OF DAYTON, OHIO, ASSIGNOR OF ONE-HALF HIS RIGHT TO WILLIAM H. NAUMAN, OF SAME PLACE.

IMPROVEMENT IN HORSE HAY-RAKES.

Specification forming part of Letters Patent No. 214,713, dated April 22, 1879; application filed January 11, 1879.

*To all whom it may concern:*

Be it known that I, CHARLES SCHOLZ, of Dayton, in the county of Montgomery and State of Ohio, have invented certain new and useful Improvements in Horse Hay-Rakes; and I do hereby declare the following to be a full, clear, and exact description of the same.

This invention relates to that class of wheeled horse hay-rakes in which the traction of the machine is employed, at the will of the operator, to elevate the teeth and discharge the collected loads while the machine is either going forward or is in the act of turning around. As a class, these machines either employ ratchets upon the wheels and have dogs connected to the rake-head, which, when thrown into gear with the ratchets upon the wheels, lock the rake-head to the wheels, so that as the machine advances, the rake-head oscillates and raises the teeth, or else one or both of the wheels are keyed upon a revolving axle, which is provided with ratchets or gearing, whereby the rake-head may be connected to said revolving axle, to cause the oscillation of the rake-head and the elevation of the teeth.

My rake consists, essentially, of an oscillating head, to which the teeth are attached, mounted upon a shaft or axle, upon whose outer ends the supporting or carriage wheels revolve.

The usual frame-work and thills are employed to support the driver's seat and draw the machine.

Upon the inner sides of the wheel-hubs are internal or female ratchets, and upon the ends of the rake-head are disks, concentric with the axle, which fit over and cover the internal ratchets, thus forming housings. Spring-dogs are attached to the axle within the ratchet-housings, whereby the axle may be locked with the wheels, at the will of the operator.

By means of a foot-lever and connecting mechanism the axle can be locked by one movement both with the carriage-wheels and with the rake-head, so that as the machine advances or turns the rake-head is oscillated and the teeth are elevated to free them of the collected loads. The disengagement of the rake-head, axle, and wheels is effected automatically when the teeth have been sufficiently elevated.

The novelty of my invention consists, first, in the combination of a vibrating but non-rotating axle with an oscillating rake-head mounted on said axle as its support and center of oscillation; second, in combining said oscillating rake-head and vibrating axle with ratchets and dogs, whereby the teeth may be lifted by the traction of the machine at the will of the operator; third, in the combination of an oscillating rake-head, a vibrating axle, and carriage-wheels with connecting mechanism, whereby the rake-head, axle, and wheels are locked together, at the will of the operator, and whereby the lifting-power for the rake-head is applied at or near its center; fourth, in combining, with said oscillating rake-head, vibrating axle, and connecting mechanism, a stop or throw-out, whereby the axle and the rake-head are automatically disengaged when the teeth are sufficiently elevated; and in other details, all as will be herein set forth and claimed.

Figure 3:
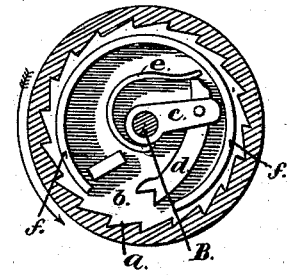
Figure 2:
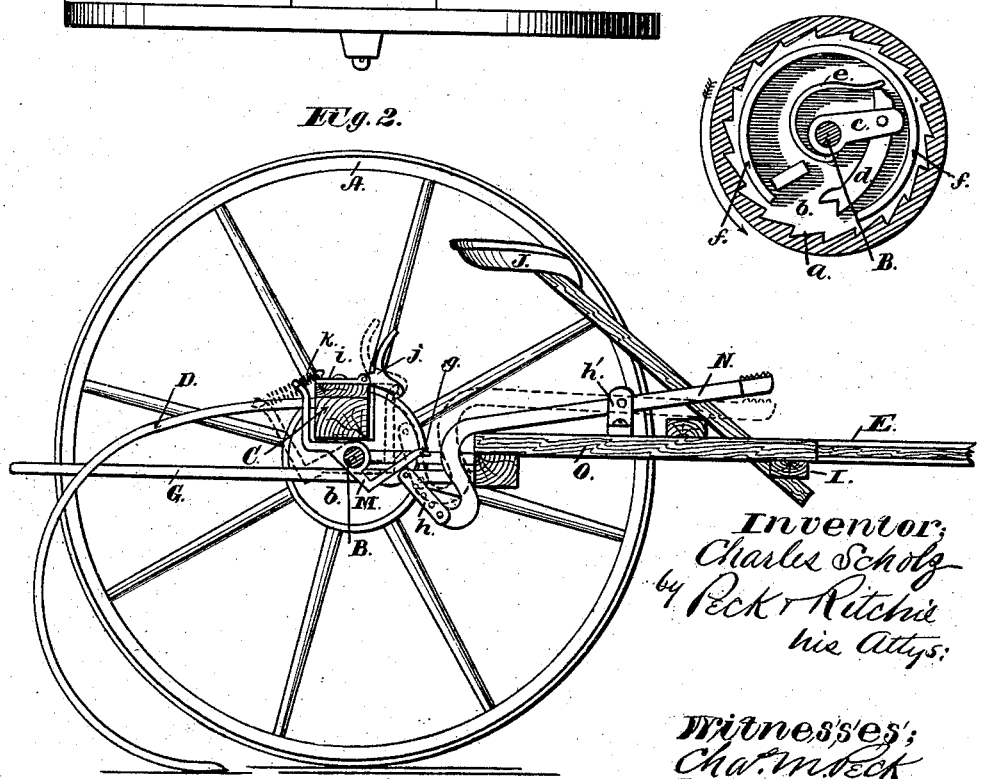

In the accompanying drawings, Figure 1 is a plan view of my improved rake. Fig. 2 is a side elevation of the same through the line $x\ x$ of Fig. 1. Fig. 3 is a transverse view through the line $y\ y$ of Fig. 1.

A A are the supporting or carriage wheels, revolving loosely (except as hereinafter explained) upon the ends of a metal axle or shaft, B, extending parallel with and along the forward under side of the wooden rake-head C, to which the teeth D are attached in any suitable way. The thills E are bolted at their rear ends upon the cleaner-bar F, from the rear of which, and under the rake-head, project the cleaner-sticks G. H and I are the ordinary cross-bars attached to the thills, and serving as supports for the driver's seat J, arranged in the usual way.

From the rear side of the bar F, in line with the ends of the thills, extend the strap-hinges K, whose rear ends encircle the axle B. To the inner sides of the wheel-hubs are attached, either integrally therewith or separate therefrom, the housings L, containing internal or female ratchets, $a$, Fig. 3, which always revolve with the carriage-wheels. Secured upon each end of the rake-head is a flanged disk, $b$, arranged concentrically with the axle B, and forming a bearing for the rake-head, which oscillates upon the axle. These disks form coverings for the ratchet-housings, into the open ends of which they extend. Keyed upon the ends of the axle B, just on the outer sides of the disks b, are the cranks c, Fig. 3, having pivoted in their outer ends curved dogs d, of the shape shown. Attached to the bearing ends of the cranks c are curved flat springs e, of the shape shown, whose free ends bear against the upper ends of the dogs, as seen.

The lower portion of the flange f is cut away, so as to permit the ends of the dogs to come into contact with the ratchets when the operator desires to dump the rake. Keyed or otherwise securely fastened upon the axle B at or near its middle is a lever-arm, M, of the shape shown, having an upwardly and rearwardly projecting portion, as seen in Fig. 2. The forward extremity of this lever, which is provided with a catch, g, is connected by a double link, h, to the rear end of a treadle, N, pivoted upon a bearing, h', which last is supported by a cross-piece, O, Fig. 1. Fastened to the top of the rake-head, just over the lever M, is a metal plate, i, in the front part of which is pivoted a gravitating-latch, j, of the shape indicated. Projecting upward from the rear part of this plate is a pin or projection, from which a spiral or other spring, k, extends, and is connected to the upper rear end of the lever M, as seen in Fig. 2.

The rake may be supplied with an ordinary hand-lever, P, with its connection, as shown in Fig. 1.

It will be observed that the wheels are free to revolve upon the axle B, which does not rotate, though it is capable of vibration or oscillation when the lever M is moved by pressing upon the treadle N. It will further be noted that the rake-head is free to oscillate upon the axle B as its axis.

To cause the rake to elevate its teeth to discharge the collected loads, and then reset itself, it is only necessary for the driver to press his foot upon the forward part of the treadle M until the gravitating-latch j catches and holds it, as represented by the dotted lines, Fig. 2. This action of the lever M, while locking together the rake-head and axle, also partially turns the axle, and with it the cranks c, whose dogs are brought down into engagement with the ratchets on the wheels, thus locking the parts together, so that as the rake advances or turns, the rake-head also partakes of the motion of the advancing wheels or wheel, and elevates the teeth. When the rake-head has tilted far enough forward, the upper portion of the gravitating-latch j comes in contact with the rear part of the treadle N, or with any portion or projection of the frame-work, which liberates it from engagement with the lever M, and thus breaks the lock of the rake-head, axle, and wheels, for as soon as the latch releases the lever M the spring k, acting upon the latter, returns it to the position shown in Fig. 2, and thus withdraws the dogs from the ratchets, and at the same time the teeth fall back to raking position.

While the above construction is probably the best, still there are certain modifications which can be made without affecting the principle of my invention. For instance the springs upon the dogs may be dispensed with and the rake will operate just the same. Again, the spring k may be placed under the forward part of the treadle N, instead of upon the rake-head, as described; and, further, the ratchets may be external, as ratchets are ordinarily made, and by a slight obvious change in the shape of the dogs the same results will be produced in the same way. Therefore I do not wish to be limited to the precise construction herein shown; but What I do claim is as follows:

1. In a wheeled horse hay-rake, the combination, with the rake-teeth and the carriage-wheels, of an oscillating non-rotating locking-axle connecting said wheels, whereby, upon rocking or partially rotating said axle, a lock is formed which, as the machine advances or turns, causes the elevation of the teeth.

2. An oscillating rake-head mounted on an oscillating but non-rotating axle, and having bearings, through which the axle passes and oscillates, as set forth.

3. An oscillating rake-head mounted on an independent oscillating but non-rotating axle, in combination with rotating ratchet-wheels, and a device for connecting the rake-head to the ratchets, at the will of the operator, for the purpose of raising the teeth and discharging the hay when the rake is advancing or turning.

4. In a wheeled horse hay-rake, an oscillating non-rotating axle provided with dogs or pawls, in combination with the carriage-wheels provided with ratchets so constructed that upon vibrating said axle its engagement with the carriage-wheels is effected, as set forth.

5. The combination, in a wheeled horse hay-rake, of an oscillating rake-head, an oscillating non-rotating locking-axle, and carriage-wheels with connecting mechanism, whereby the rake-head, axle, and wheels may be locked together, at the will of the operator, to cause the elevation of the teeth and the discharge of the collected loads.

6. The combination, in a wheeled horse hay-rake, of an oscillating rake-head, an oscillating non-rotating locking-axle, and carriage-wheels with connecting mechanism so arranged as to apply the lifting-strain at or near the center of the head, as set forth.

7. In a wheeled horse hay-rake, the combination of an oscillating axle, a rocking rake-head mounted on said axle as its center of oscillation, lifting-ratchets revolving with the carriage-wheels, a latch or detent attached to the head, and capable of holding the head, the axle, and the wheels in engagement, and a stop against which the latch or detent strikes at its extreme forward movement, to automatically release it from the ratchet and reset the rake-teeth, as set forth.

8. The combination, with the oscillating axle B, provided with dogs or pawls, of the lever-arm M, connected to the treadle-lever N, whereby said axle may be vibrated to cause its engagement with the carriage-wheels, as set forth.

9. The combination, with the oscillating rake-head, the oscillating axle, and its lever M, of a gravitating latch or detent, $j$, substantially as and for the purpose set forth.

10. The combination, with the oscillating axle B, of the cranks $c$, the dogs or pawls $d$, and the spring $e$, with the ratchets $a$, as set forth.

Witness my hand this 6th day of January, A. D. 1879.

CHARLES SCHOLZ.

Witnesses:
   CHAS. M. PECK,
   PATRICK H. GUNCKEL.